United States Patent
Veilleux

[15] 3,695,379
[45] Oct. 3, 1972

[54] IGNITION SAFETY SWITCH SYSTEM

[72] Inventor: Bernard J. Veilleux, 9028 Highway 49 Rt. 1, St. Paul, Minn. 55111

[22] Filed: Aug. 17, 1970

[21] Appl. No.: 64,326

[52] U.S. Cl. ............180/103, 123/98, 123/102, 123/198 D, 180/109, 200/61.89, 307/10 R, 340/53
[51] Int. Cl. ..................................B60k 33/00
[58] Field of Search............180/82, 103, 105–110; 307/10 R; 192/3; 123/98, 102, 198 D; 340/53; 200/61.89; 74/513

[56] References Cited

UNITED STATES PATENTS

| | | | |
|---|---|---|---|
| 2,517,619 | 8/1950 | Ainley | 340/63 |
| 3,569,931 | 3/1971 | Baxter | 340/63 |
| 3,273,552 | 9/1966 | Plath | 123/98 X |
| 2,793,706 | 5/1957 | Moreland | 180/82 |
| 2,509,400 | 5/1950 | Roswell | 180/103 |
| 3,487,183 | 12/1969 | Schulman | 200/61.89 |
| 1,507,266 | 9/1924 | Whittingham | 180/82 X |

*Primary Examiner*—Leo Friaglia
*Assistant Examiner*—John P. Silverstrim
*Attorney*—Reif and Gregory

[57] ABSTRACT

This invention relates to an automotive vehicle safety system comprising an ignition circuit breaker to be actuated in the event that the throttle of the vehicle becomes unexpectedly uncontrollable in opened position.

This system includes a pair of switches which involve the ignition circuit, said switches being normally in position as not to interrupt flow of current through the ignition circuit. One of said switches is actuated automatically to break the ignition circuit in the event of the breakage of the throttle lever spring and the other of said switches is manually energized to de-energize said first mentioned switch and to break said ignition circuit by action of the operator in the event the throttle lever is frozen resulting in unexpected loss of engine speed control.

1 Claim, 2 Drawing Figures

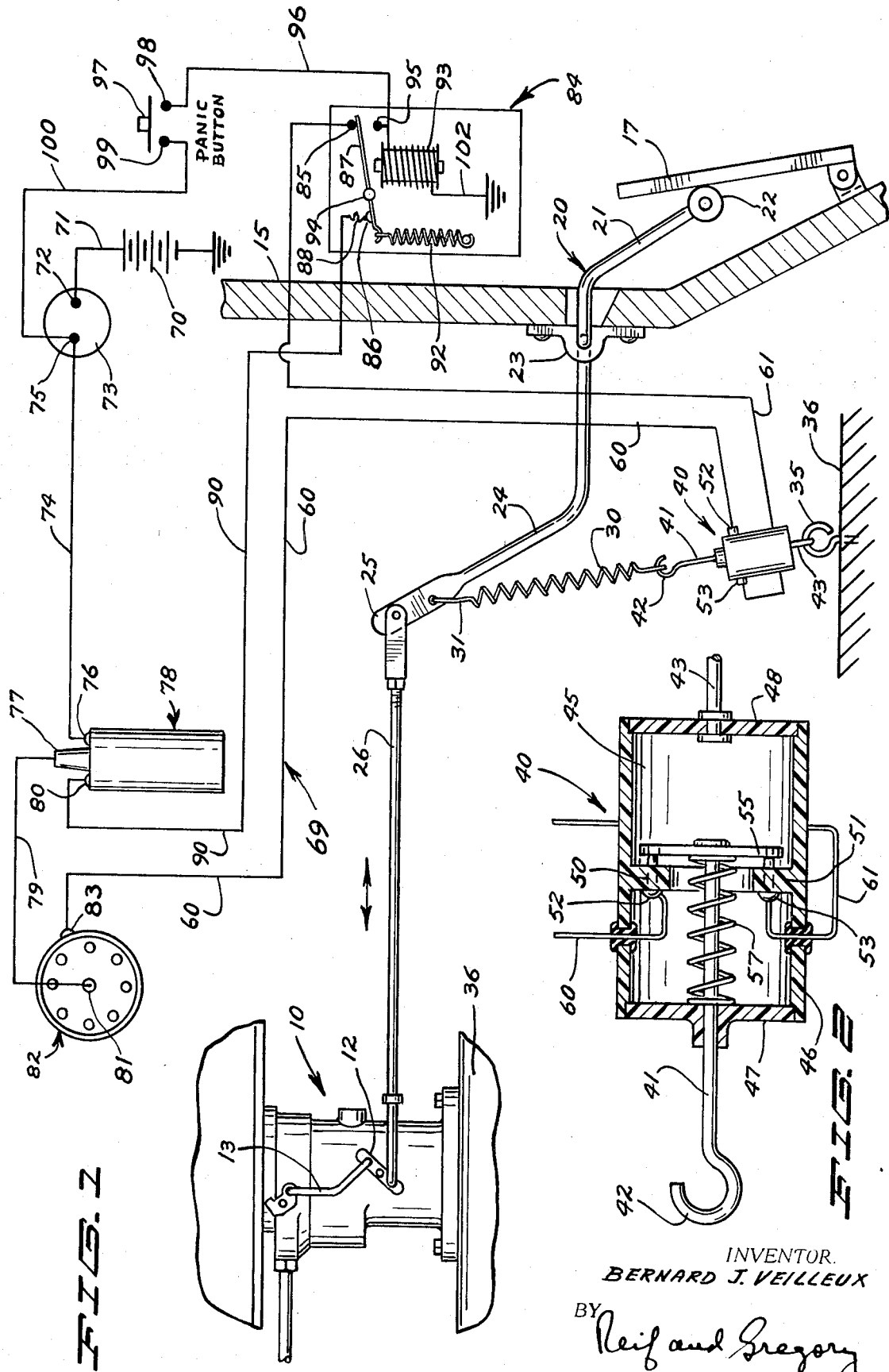

3,695,379

IGNITION SAFETY SWITCH SYSTEM

BACKGROUND AND SUMMARY OF THE INVENTION

This invention relates to a system arranged and constructed to break the ignition circuit of an automotive vehicle in the event that the throttle becomes immobilized in open position and beyond the control of the operator.

One cause of an automotive vehicle getting beyond the control of the operator results from the breakage of the throttle spring upon which breakage the operator loses control of the throttle and of the speed of the engine of the vehicle. Another cause of loss of control of an automotive vehicle occurs when the throttle lever of the carburetor becomes uncontrollable in opened position because of a malfunction or freezing of carburetor linkage. The operator loses control of the speed of the engine and in such instance a switch is provided within easy reach of the operator to be actuated manually to break the ignition circuit.

The essential contribution of the invention herein is to provide adequate control of the engine to prevent the development of runaway speeds upon malfunction of the throttle lever or of carburetor linkage.

Generally stated the invention herein consists of a switch in circuit with the ignition circuit of an automotive vehicle and connected with the throttle lever spring whereby upon said spring breaking, said switch is actuated to break the ignition circuit and includes in connection therewith a second switch whereby upon the carburetor linkage becoming frozen in accelerated position, said second switch is actuated and has in connection therewith delay means whereby upon said switch being actuated, the ignition circuit is broken for a sufficient length of time for the operator to turn the ignition key to off position.

It is an object of this invention therefore to provide means to prevent the engine of a motor vehicle from developing unexpected or accelerated speeds beyond the control of the operator.

It is another object of this invention to provide means to automatically break the ignition circuit of an automotive vehicle upon the malfunction of the throttle lever or carburetor linkage.

It is another object of this invention to provide readily accessible and readily operable means with respect to action by the operator for breaking the ignition circuit of an automotive vehicle.

More specifically it is an object of this invention to provide means which may be readily installed as auxiliary equipment upon an existing vehicle for control of the throttling of the engine thereof to prevent the engine from developing unexpected accelerated speeds as a result of malfunction of the throttle lever or of the carburetor linkage.

It is also an object of this invention to provide a relatively inexpensive safety system to be installed upon an existing vehicle to prevent the development of unexpected speeds of the engine as above indicated.

These and other objects and advantages of the invention will be set forth in the following description made in connection with the accompanying drawings in which like reference characters refer to similar parts throughout the several views and in which:

FIG. 1 is a diagramatic view showing the operation of a throttle lever and including a wiring diagram of the circuitry in connection therewith, and FIG. 2 is a view in longitudinal transverse section on an enlarged scale showing a switch element.

DESCRIPTION OF A PREFERRED EMBODIMENT

Referring to the drawings, a conventional carburetor 10 is indicated showing a throttle lever 12 and carburetor linkage 13 extending therefrom into the carburetor housing for conventional operation of the valve structure therein.

Shown diagramatically is a portion of a fire wall 15 of an automotive vehicle. A foot operated throttle or gas pedal 17 is shown pivoted as at the lower portion of said fire wall.

Extending through said fire wall is one conventional form of a throttle rod 20 having an appropriately angled portion to have the inner end portion 21 thereof equipped at its free end with a roller 22 for engagement by said foot pedal 17. An intermediate portion 24 of said throttle rod at the outer side of said fire wall is disposed through a pivot bracket 23 and has an upwardly extending portion having a flat end portion 25 pivoted to the adjacent end of a straight portion 26 of said throttle rod which extends to said throttle lever 12 for pivotal connection therewith. The portions 21, 24 and 26 may be regarded as comprising the throttle linkage.

A throttle return spring 30 is provided which normally urges said throttle linkage to hold said throttle lever 12 in closed position. Said spring has end portion 31 thereof connected to said flat end portion 25 and said spring conventionally would have its other end 32 connected to a retaining member such as an eye bolt 35 which may be suitably secured as to the engine block of the motor which is here merely indicated by the reference numeral 36.

Disposed between said spring 30 and said eyelet bolt 35 and respectively connected thereto as will be described with respect to the embodiment of the invention disclosed herein, there is a safety switch member 40 which comprises an essential element of the invention herein.

Said switch member may suitably have a cylindrical form of housing 46 as here indicated and is shown having end walls 47 and 48 with a chamber 45 therein. Extending outwardly of end wall 47 is a switch actuating means 41 formed here as a rod having a hooked end portion 42 for connection with the adjacent end of said spring 30. Extending from the wall 48 is a hook member 43 which is secured to the eyelet bolt 35.

Said housing has opposed non-conductive flange portions 50 and 51 respectively carrying contacts 52 and 53 with said contacts extending through said flange portions, as illustrated for engagement with an underlying plate-like contact member 55. Said contact member is carried at the inner end of said actuating rod 41. Carried about said rod 41 between said contact member 55 and the inner side of said wall 47 is a coil compression spring 57 which will normally urge the plate member 55 out of engagement with the contacts 52 and 53. Extending through said housing from said contact 52 is a line 60 and extending from said contact 53 through said housing is a line 61. Said lines will be appropriately insulated as by grommets in extending through the walls of said housing 46.

For a description of the ignition circuit 69 with respect to the disclosure herein, a line 71 runs from the battery 70 to one side 72 of the ignition switch 73. A line 74 runs from the other side 75 of the ignition switch to a contact 76 of a coil 78. A line 79 runs from a contact 77 of said coil to the contact 81 of a distributor 82. Conventionally, a second line would run from said distributor to said coil. In the embodiment of the invention described herein, however, said second line here indicated as line 60 runs from the contact 83 of said distributor to the contact 52 of said safety switch 40. The line 61 from the contact 53 of said safety switch 40 runs to a contact 85 of a relay 84. Running from the contact 86 of said relay to a contact 80 of the coil 78 is a line 90. Said contacts 85 and 86 are normally engaged to close the circuit comprising said lines 61 and 90 by means of the contact plate 87 pivoted as at 94 and held in said contacting position by a spring 92. Said contact 86 is a movable contact moving with the contact plate 87 and having a movable line portion 88 connecting it to the line 90. This is conventional structure.

Said relay 84 is a conventional holding relay comprising a solenoid 93 which when energized will draw the contact plate 87 away from engagement with the contact 85 and into engagement with the contact 95.

Running from the solenoid 93 of said holding relay 84 is a line 96 which runs to contact 98 of a "panic" switch 97 which will be prominently located on the dash of the automotive vehicle and which will bear the indicia such as "Panic Button." A line 100 will run from the other contact 99 of said switch 97 to the contact 75 of the ignition switch 73. The line 96 in running to said solenoid is in circuit with a grounded relay wire 102 and lines 100 and 96 comprise a circuit independent of said ignition circuit. The line 96 includes the contact 95.

OPERATION

The throttle lever 12 of the carburetor is conventionally urged to open position for engine acceleration by depression of the foot operated gas or throttle pedal 17. The retraction of the throttle lever is caused by the throttle return spring 30.

In the event of a breakage of the throttle return spring 30 in a conventional installation, there are no means for the operator of the vehicle to retract the throttle lever. The breakage of the throttle spring will result in a wide open throttle lever and an unexpectedly high acceleration of the engine with no immediate control which may be exercised by the operator except for turning off the ignition switch by turning the ignition key. Normally the operator of a vehicle would not react quickly enough to turn off the ignition switch or would lose time in groping for it in being seized by panic or wonderment as to what has happened and during the loss of time the vehicle will be traveling at an uncontrolled speed.

An essential element of the invention herein consists of the use of the safety switch 40 which is secured and carried between the throttle return spring 30 and the anchorage bolt 35. The throttle return spring normally will exert sufficient pull on the switch rod 41 to maintain the contact plate 55 in engagement with the contact points 52 and 53 to maintain a closed switch condition. Upon the breakage of the throttle return spring, the actuating rod 41 will be moved away from the contacts 52 and 53 by the compression spring 57 and the ignition circuit will be broken and thus the engine of the vehicle will be rendered inoperative instantly.

There are occasions when the carburetor linkage 13 might possibly malfunction and become stuck within the carburetor and thus freeze the throttle lever 12 in an open position to such an extent that the pull of the throttle return spring is overridden and there results an uncontrolled and possibly a substantial unexpected acceleration of engine speed. The invention herein provides means for breaking the ignition circuit by the operator of the vehicle not with the requirement of groping for and turning off the ignition key but merely by reaching out to a readily accessible portion of the dash to depress and engage switch 97 which is prominently marked as by the indicia "Panic Button" and which is of sufficient size to be easily engaged. The switch button 97 is normally urged away from the contacts 98 and 99. This switch is in the circuit comprising lines 100 and 96 running from the ignition switch 73 to a holding relay 84 wherein when said switch 97 is closed, the solenoid 93 is energized to break the connection between the contact 85 by drawing and holding the contact plate 87 away from said contact 85 and into engagement with the contact 95. Said solenoid 93 upon being energized will hold the contact plate to permit the operator to reach for and turn the ignition key to off position.

It is seen that when engagement of the contact plate 87 with the contact 85 is broken, the switch 40 is de-energized and the ignition circuit with respect to the distributor 82 is broken. The switch 97 is in a circuit auxiliary to said ignition switch circuit and serves to energize the holding relay for so long as said switch is closed. Upon engagement of the contact plate 87 with the contact 95, a new circuit is formed and closed which includes the ignition coil 78. It is noted that the ignition coil is energized until the ignition switch is turned to off position. The ignition coil will supply current to energize the solenoid to continue holding the contact plate 87 into engagement with the contact 95 after the operator removes his hand from the switch 97 and until he turns off the ignition switch by turning the ignition key. The contact plate 87 then returns to engagement with the contact 85.

Thus the invention herein provides means to bring under control and to shut off unexpectedly accelerated engines either by the automatic operation of the safety switch 40 or by de-energizing said switch by the readily manually operated panic switch 97. It is seen that the panic switch 97 is normally not a part of the ignition circuit but said switch upon being operated energizes the holding relay 84 to break the ignition circuit with respect to the distributor. The panic switch will be prominently located and of sufficient size to be readily accessible to an instantaneous reaction on the part of the operator. A break of the throttle spring will result in an automatic break of the ignition circuit with respect to the distributor and thus will shut off the engine.

A practical thing to be recognized is that generally an operator of a vehicle who reaches for an ignition key without looking at it, does not reach it directly but rather gropes for it. Under stress of what might be regarded as a panic situation there is a very real likelihood of the loss of seconds of time in reaching blindly for the ignition key when one's attention and one's eyes are fixed onto the road. A relatively large, prominently located button switch in front of the operator could be reached almost with unthinking instant reflex action and the ignition circuit could be interrupted and broken very quickly.

It is seen that the safety switch 40 and the relay 84 are readily installed within the circuitry of an automotive vehicle and that this modification of conventional wiring is very readily accomplished.

It will of course be understood that various changes may be made in form, details, arrangement and proportion of the parts without departing from the scope of the invention herein, which, generally stated, consists in an apparatus capable of carrying out the objects above set forth, in the parts and combinations of parts disclosed and defined in the appended claims.

What is claimed is:

1. An ignition circuit breaker system in connection with the ignition circuit of an automotive vehicle including an ignition coil and a distributor and a throttle return spring having in combination a safety switch in said circuit having said throttle spring normally holding the same in closed position, said throttle return spring upon breaking automatically opening said second switch to open said ignition circuit and de-energize said distributor, a second safety switch in said circuit in series with said safety switch, said second safety switch having a movable contact plate in connection with one contact thereof, a spring normally holding said contact plate in position to close said second switch, a second circuit including a solenoid, and manual means operating said second circuit to energize said solenoid to move said contact plate from said contact of said second mentioned switch to a contact of said second circuit to by-pass and de-energize said distributor and to energize said solenoid by said coil.

* * * * *